July 24, 1956
M. T. LYBROOK
2,756,290
AUTOMOTIVE SEAT ADJUSTING SWITCH
Filed June 8, 1954
3 Sheets-Sheet 1
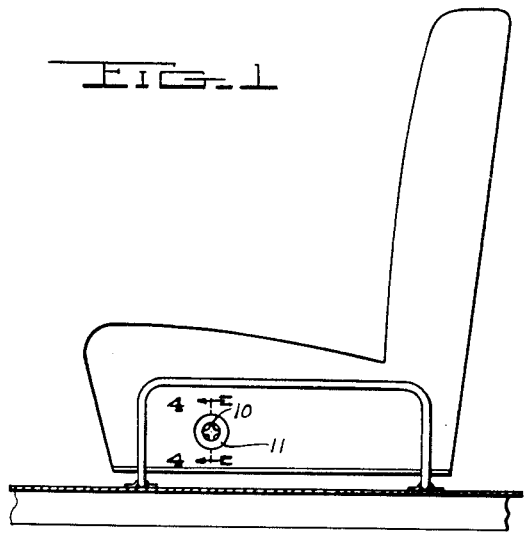
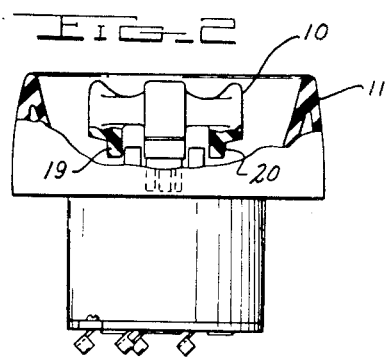
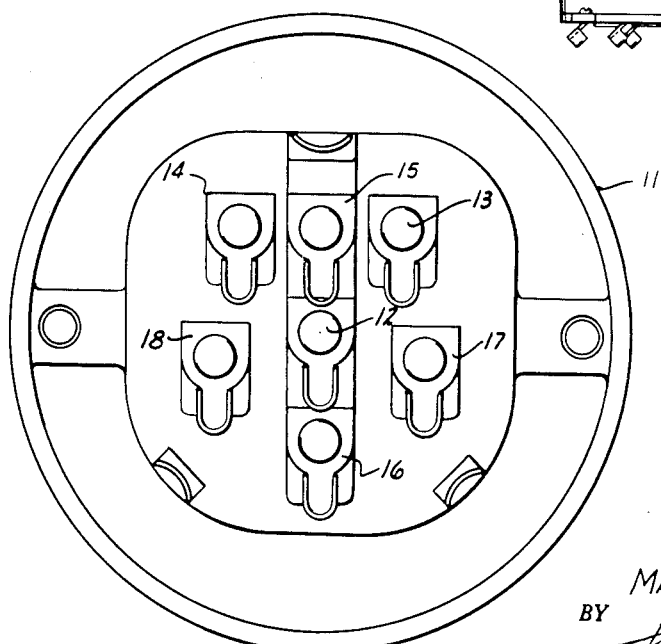
INVENTOR.
MALCOLM T. LYBROOK
BY
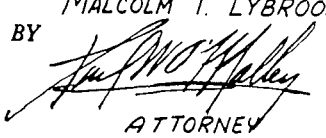
ATTORNEY July 24, 1956

M. T. LYBROOK 2,756,290

AUTOMOTIVE SEAT ADJUSTING SWITCH

Filed June 8, 1954

INVENTOR.
MALCOLM T. LYBROOK
BY
ATTORNEY

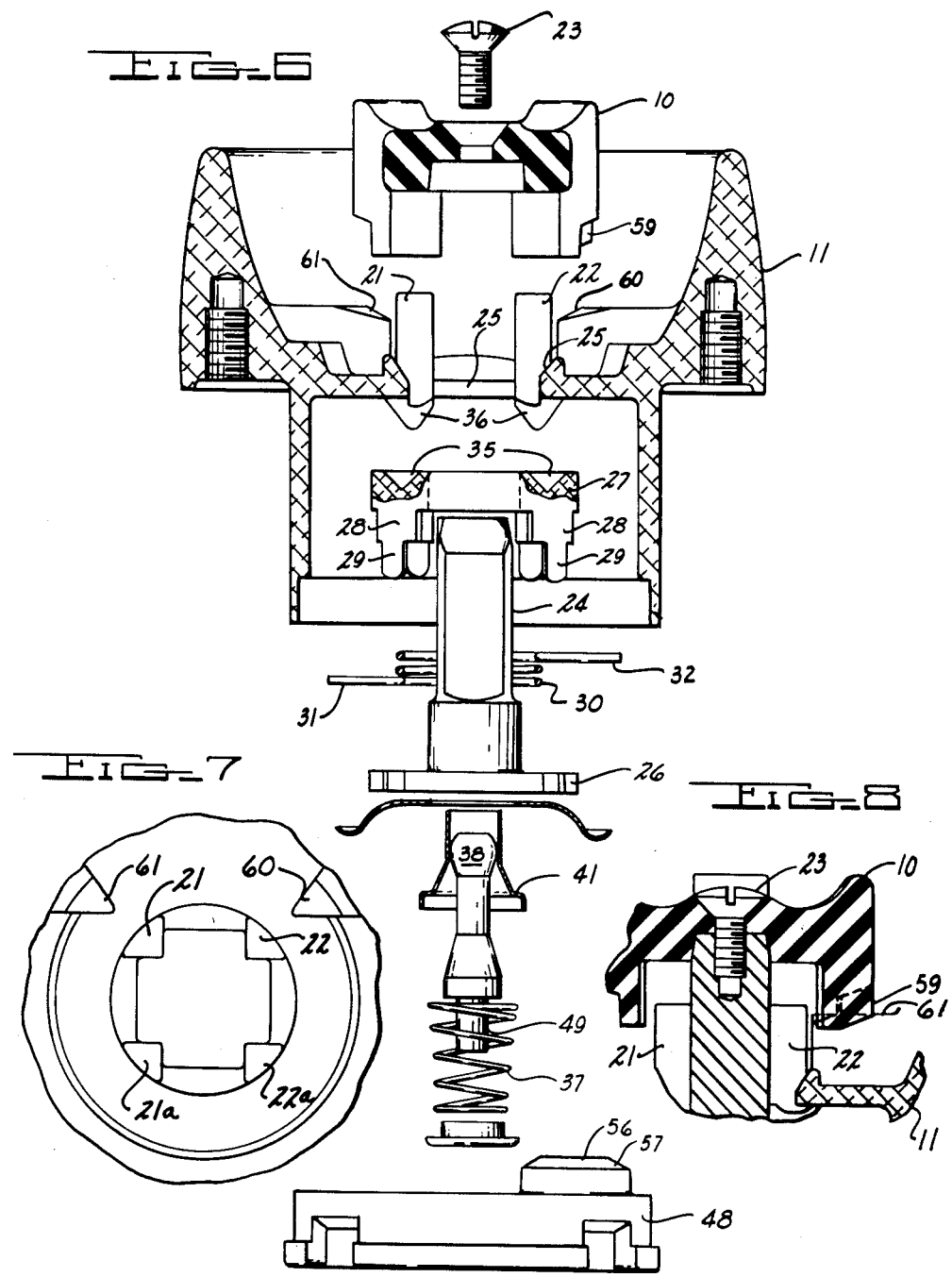

United States Patent Office 2,756,290
Patented July 24, 1956

2,756,290

AUTOMOTIVE SEAT ADJUSTING SWITCH

Malcolm T. Lybrook, Logansport, Ind., assignor to Essex Wire Corporation

Application June 8, 1954, Serial No. 435,222

3 Claims. (Cl. 200—6)

This invention relates to electrical switches and in particular to an automotive seat adjusting switch.

It has become common practice to make the operator's seat of a motor vehicle adjustable. The operator as a result may adjust the seat to a comfortable position for driving which in turn tends to eliminate driver fatigue. A further safety factor is also inherent in the adjustable seat in that it makes possible the adaptation of almost any human conformation to the controls of the vehicle. The operator can adjust the seat for maximum visibility and for optimum control accessibility. By improving his control of the vehicle the operator makes its operation both safer for himself and for other vehicular and pedestrian traffic.

The first such seat adjustment provided was a manually operated back and forth adjustment. The next step was to provide for a vertical adjustment of the seat by the use of auxiliary power. Most recent advances have included means for adjustably tilting the operator's seat. Ordinarily an electric motor is provided as the auxiliary power for each adjustment so that where theree adjustments are provided it is necessary to provide three motors, and a switching means. To date, separate toggle switches have been employed for switching. With the advent of the three-way seat adjustment, the industry has demanded a single switch to eliminate the driver confusion resulting from the multitude of switches and has also demanded that switch movement coincide with and indicate direction of adjustment. This invention provides a switch which attains these objectives. It provides the multiple switching required as well as combining rotary and toggle action in such a manner that switch movement is indicative of the direction of adjustment.

The operation of the switch is hereinafter described in conjunction with the attached drawings wherein:

Fig. 1 illustrates the positioning of the switch on the vehicle operator's seat.

Fig. 2 is a side elevation of the switch partially in section.

Fig. 3 is a bottom view of the switch of Fig. 1 showing multiple terminal connections.

Fig. 6 is an exploded view of the components.

Fig. 7 is a top view of the switch housing.

Fig. 8 is a view taken along the line 4—4 and partially in section.

Figure 4:
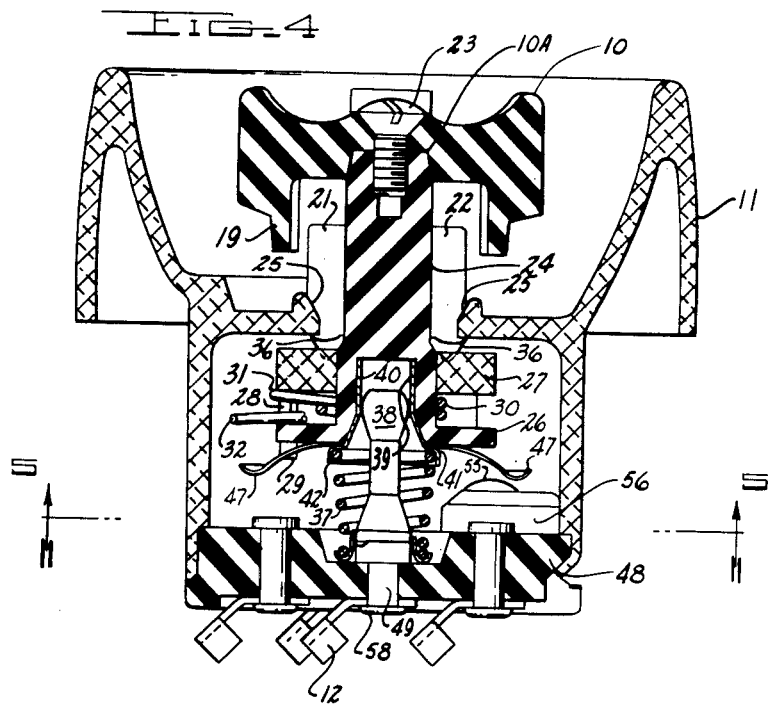
Fig. 4 is a cross section in the direction indicated by 4—4.

The operation of the switch is such that the vehicular operator can reach down to the switch when it is positioned as in Fig. 1 and move the switch knob 10 in the direction of adjustment desired. This is possible because the switch knob is both tiltable and rotatable. Thus, if the operator wishes to raise the seat, he merely pulls upward on the switch knob which is tiltable on its axis. To go down, forward or rearward, he again merely moves the knob in the direction of movement desired. To tilt the seat forward, the knob is rotated counterclockwise as the switch is viewed in Fig. 1 and for rearward tilting the knob is rotated in a clockwise direction again corresponding to the direction in which the seat moves. Thus, it can be seen that a single switch combines multiple switching with rotary and toggle action to indicate direction of adjustment.

The circuitry associated with the switch can be readily understood by reference to Fig. 3. The centrally located terminal 12 is the hot terminal connected to the car battery. Upon manual actuation of the switch, a circuit is completed from hot terminal 12 to any one of the other terminals and the battery thereby can supply the exciting current to a motor to move the seat in the desired direction. By way of example, if the switch of Fig. 1 is moved upward, the switch provides an electrical path from hot terminal 12 to terminal 15. Similarly, if the switch is rotated counterclockwise to tlit the seat forward, a circuit is completed between treminal 12 and terminal 13. It is to be understood that the terminals are paired (13 and 14, 15 and 16, 17 and 18), each pair to complete circuits to control a single reversible motor and that three motors provide six way adjustment. Up and down adjustment for example is obtained from one motor by reversal of the motor.

One embodiment of the switch is illustrated in Fig. 2 where the switch knob 10 is shown partially encased by the housing 11 to protect the knob. This is deemed a preferred embodiment as the switch is usually located where it is vulnerable to kicks and scuffs.

Fig. 4 illustrates the detailed construction of the switch. The knob 10 is recessed at 10A to receive a square shaped actuator 24 and is further secured to the actuator by means of the screw 23. The entire actuator assembly is tiltable on its central axis. Tilting limit is based upon the distance between the actuator and the edges 25 of the housing 11. When the actuator assembly is tilted, rotational movement is prevented by the actuator 24 entering one of the spaces between two of the four equally spaced stops 21, 21A, 22, and 22A of housing 11. Rotational travel limitation is obtained by the extended portion 59 of switch knob 10 abutting stops 60 and 61 of housing 11.

The actuator 24 has an outward flange 26 which serves as a means of attachment for the positioning plate 27. The positioning plate has four spaced arms 28 with inwardly turnable lips 29 for seizing the positioning plate to the actuator flange 26. The spring 30 with ends 31 and 32 is mounted on the actuator 24 between the positioning plate 27 and actuator flange 26 to provide yieldable rotational movement. The ends 31 and 32 extend outwardly and are positioned within the shoulders 33 and 34 of the housing 11 (Fig. 5), so as to abut against the shoulders when the actuator assembly is rotated. Thus, if the switch knob 10 in Fig. 1 is rotated clockwise, the spring 30 will rotate until spring end 31 engages shoulder 34 of the housing. Upon continued rotation of knob 10 the spring 30 will wind up as spring end 31 abuts shoulder 34 while spring end 32 continues its rotary motion being driven by arm 28 of positioning plate 27. Upon release of the switch knob, the spring will tend to return the actuator assembly to its normal position. It can be seen from Fig. 5 that the spring ends 31 and 32 are not normally in contact with the shoulder 33 and 34 when the actuator assembly is in the normal position and hence will not provide full restoration of the actuator assembly to its normal position after rotary displacement. The additional means of restoration is provided by detents 35 in the positioning plate 27 which mate with lugs 36 of the housing 11. When the actuator assembly is rotated, the entire assembly is cammed downwardly by action of the lugs 36 compressing the helical spring 37. When the switch knob is released after rotational displacement, the combined efforts of springs 30 and 37 cause a seating of the lugs 36 in the detents 35 for positive positioning of the actuator assembly.

The entire actuator assembly is supported by the universal mount 38 and helical spring 37 which provides yieldable tilting movement. As can be readily understood, the helical spring is depressed in the direction of tilting of the actuator assembly and will tend to restore the assembly to its normally upright and open position. The pivot for the tilting of the knob assembly comprises the lugs 36 opposite from the direction of tilting. For example, when the switch knob 10 of Fig. 4 is tilted to the left the lugs 36 on the right will act as the fulcrum. The actuator cannot, however, move in an arcing manner about the lugs 36 and must move in an in line manner or, up and down, on the mount 38. Thus as the switch knob 10 is tilted, the fulcrum lug will move slightly out of its seat in the positioning plate 27. When the switch knob is released and is returned to its normally upright position by action of the coil spring 37 the lugs 36 which are serving as fulcrum lugs will reseat themselves in the mating detents 35 for positive positioning.

The recess 39 of the actuator 24 provides for mounting the actuator assembly on the mount 38. A ferrule 40 is provided which is in bearing contact with the mount 38. The ferrule is flanged at 41 and cupped at 42. The cupping 42 receives the end coil of the spring 37 thereby axially aligning the coil spring and the actuator assembly. A contact plate 43 is held between the end of the actuator 24 and the ferrule flange 41 by the spring 37. Thus, it can be seen that the contact plate is affixed to the actuator assembly and moves with the actuator as the actuator is returnably tilted or rotated.

Figure 5:
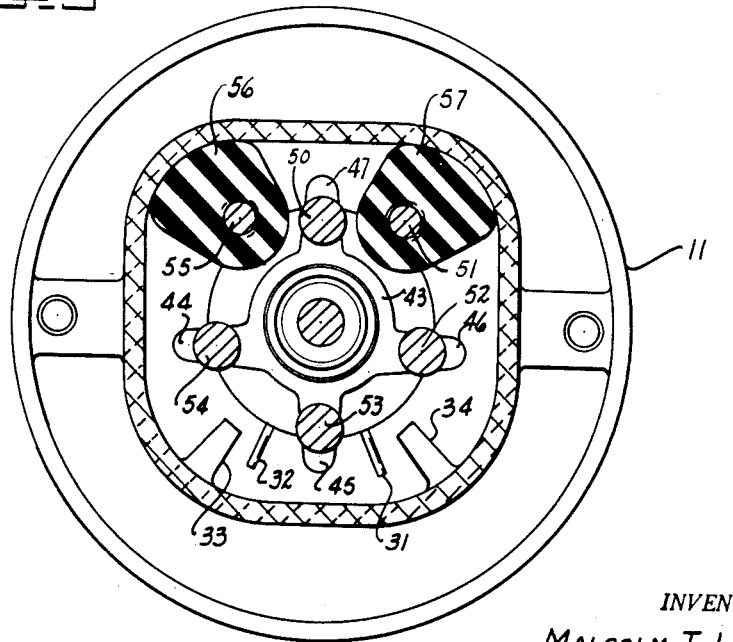
Fig. 5 is a cross section in the direction indicated by 5—5.

The contact plate 43 has four contact carrying arms 44, 45, 46, and 47 (Fig. 5). Referring to Fig. 4 it can be seen that the contact plate 43 is spaced apart from the terminal block 48 carrying contacts 50, 51, 52, 53, 54, and 55. This provides for the toggle action of the switch. As the switch knob is moved in any one of the directions of desired linear adjustment, up or down, forward or back, a contact carrying arm of the contact plate is depressed and comes into contact with a mating terminal block contact. If switch knob 10 is moved upwardly, for example, contact arm 47 is depressed engaging contact 50 of the terminal block which serves to bring into play an electric motor to raise the seat. Similarly contact arms 44, 45, and 46 can be depressed to engage contacts 54, 53, and 52 for rearward, downward, and forward movement respectively.

In order that rotational movement of the actuator assembly cause a mating of contacts, the mating contacts must be in approximately the same plane. By providing raised sections 56 and 57 on the terminal block, the contacts 51 and 55 are elevated to approximately the plane of contact arm 47. Clockwise or counterclockwise actuator movement will therefore permit contact arm 47 to engage contacts 51 and 55. Thus, clockwise and counterclockwise movement of switch knob 10 as well as upward, downward, forward, and rearward tilting causes the completion of an electrical circuit.

The mount 38 has a reduced portion 49 which passes through the terminal block 48 and by means of its upset end 58 serves as a rivet to join the terminal 12 to the mount 38, thus attaching the said terminal 12 and mount 38 to the said terminal block 48. Terminals 13 and 14, 15 and 16, 17 and 18 are similarly attached to contacts 51 and 55, 50 and 53, 52 and 54. The circuit to the contact plate includes the terminal 12, mount 38, ferrule 40 and contact plate 43. The completion of the circuit to any of the other terminals is completed as described by movement of the contact plate to engage the desired terminal contact.

Having thus described my invention, I claim:

1. A switch consisting of a terminal block with a plurality of raised sections, a plurality of electrical contacts attached to said terminal block, a spheroidally shaped universal mount extending from said terminal block, a housing having two openings opposite each other in one of which openings the terminal block is mounted, a square shaped actuator having a flange at one end and mounted in the housing with the flange end centered and loosely connected with the spheroidally-shaped universal mount to provide universal mounting for the actuator, the opposite end of the actuator passing through the second of said openings which is cross-shaped to limit the tilting motion of the actuator and to prevent rotational movement of the actuator when it is tilted, a positioning plate mounted on and secured to the actuator and having four detents or lugs normally engaging four corresponding lugs or detents on the inside of the housing to positively position the actuator in its normal position and to act as pivots when the actuator is tilted, a coil spring mounted on the actuator engaging the positioning plate, and having its two ends extended and positioned between two shoulders on the inside of the housing to provide yieldable rotational movement of the actuator, a contact plate affixed to the actuator flange and carrying a plurality of electrical contacts located for switching engagement with the stationary contacts on the terminal block, a helical compression spring axially disposed on said universal mount between the terminal block and the actuator flange and acting to restore the actuator to its normal position after release of the actuator following rotary or tilting movement of the actuator, whereby rotational movement of the actuator about its longitudinal axes selectively makes an electrical connection between contacts on the contact plate and certain of the contacts located on the raised sections of the terminal block, whereby tilting movement of the actuator about two axes at right angles to each other as determined by the cross-shaped opening in the housing selectively makes an electrical connection between contacts on the contact arm and certain of the contacts located on the non-raised section of the terminal block, and whereby said actuator returns to its normal position and breaks the selected electrical connection when the actuator is released after said rotating or tilting movement.

2. An automotive seat adjusting switch consisting of a terminal block with a plurality of raised sections, a plurality of electrical contacts attached to said terminal block, a spheroidally-shaped universal mount extending from said terminal block, a housing having two openings opposite each other in one of which openings the terminal block is mounted, a square shaped actuator having a flange at one end and mounted in the housing with the flange end centered over the universal mount; the opposite end of the actuator passing through the second of said openings which is cross-shaped to limit the tilting motion of the actuator and to prevent rotational movement of the actuator when it is tilted, a knob attached to the end of the actuator outside the housing and having an extended portion located between two stops on the housing such that rotational movement is limited, a positioning plate mounted on and secured to the actuator and having four detents or lugs normally engaging four corresponding lugs or detents on the inside of the housing to positively position the actuator in its normal position and to act as pivots when the actuator is tilted, a coil spring mounted on the actuator engaging the positioning plate, and having its two ends extended and positioned between two shoulders on the inside of the housing to provide yieldable rotational movement of the actuator, a contact plate affixed to the actuator flange and carrying a plurality of electrical contacts located for switching engagement with the stationary contacts on the terminal block, a ferrule having an outwardly flared and cupped end, and inserted in a recess at the flange end of the actuator to secure the contact plate, said ferrule also being centered and loosely-connected with the spheroidally-shaped universal mount to provide universal mounting for said actuator, a helical compression spring axially disposed on said universal mount between the terminal block and the cupped end of the ferrule and acting to restore the actuator to its normal position after release of the actuator following rotary or tilting movement of the actuator, whereby rotational movement of the actuator about its longitudinal axis selectively makes an electrical connection between contacts on the contact plate and certain of the contacts located on the raised sections of the terminal block, whereby tilting movement of the actuator about two axes at right angles to each other as determined by the cross-shaped opening in the housing selectively makes an electrical connection between contacts on the contact arm and certain of the contacts located on the non-raised section of the terminal block, and whereby said actuator returns to its normal position and breaks the selected electrical connection when the actuator is released after said rotating or tilting movement of the actuator and knob in the direction of seat adjustment desired.

3. An automotive seat adjusting switch consisting of a terminal block with a plurality of raised sections, a plurality of electrical contacts attached to said terminal block, a stud mounted on the terminal block and having a spheroidally-shaped termination extending away from the terminal block, a plurality of terminals disposed about the side of the terminal block opposite said contacts and stud and making electrical connection with the stud and contacts, a housing having two openings opposite each other in one of which openings the terminal block is mounted, a square shaped actuator having a flange at one end and mounted in the housing with the flange end centered over the stud; the opposite end of the actuator passing through the second of said openings which is cross-shaped to limit the tilting motion of the actuator and to prevent rotational movement of the actuator when it is tilted, a knob attached to the end of the actuator outside the housing and having an extended portion located between two stops in the housing such that rotational movement is limited, said knob being at least partially encased by the housing to protect it from damage and to prevent accidental operation, a positioning plate mounted on the actuator and secured to the actuator flange by four arms and having four detents or lugs normally engaging four corresponding lugs or detents on the inside of the housing to positively position the actuator in its normal position and to act as pivots when the actuator is tilted, a coil spring mounted on the actuator engaging two arms of the positioning plate, and having its two ends extended and positioned between two shoulders on the inside of the housing to provide yieldable rotational movement of the actuator, a contact plate affixed to the actuator flange and carrying a plurality of electrical contacts located for switching engagement with the stationary contacts on the terminal block, a ferrule having an outwardly flared and cupped end, and inserted in a recess at the flange end of the actuator to secure the contact plate, said ferrule also being centered and loosley-connected with the spheroidally-shaped stud to provide universal mounting for said actuator, a helical compression spring axially disposed on said stud between the terminal block and the cupped end of the ferrule and acting to restore the actuator to its normal position after release of the actuator following rotary or tilting movement of the actuator, whereby rotational movement of the actuator about its longitudinal axis selectively makes an electrical connection between a terminal electrically connected through the stud and the ferrule to a contact on the contact plate and one of the terminals whose corresponding contact is located on one of the raised sections of the terminal block, whereby tilting movement of the actuator about two axes at right angles to each other as determined by the cross-shaped opening in the housing selectively makes an electrical connection between a terminal electrically connected through the stud and the ferrule to a contact on the contact plate and one of the terminals whose corresponding contact is located on the non-raised section of the terminal block, and whereby said actuator returns to its normal position and breaks the selected electrical connection when the actuator is released after said rotating or tilting movement of the actuator and knob in the direction of seat adjustment desired.

References Cited in the file of this patent

UNITED STATES PATENTS

| | | |
|---|---|---|
| 1,850,769 | Porsche | Mar. 22, 1932 |
| 1,954,272 | Taylor | Apr. 10, 1934 |
| 2,453,035 | Ponsy | Nov. 2, 1948 |